(12) United States Patent
Fuchs

(10) Patent No.: US 10,112,294 B2
(45) Date of Patent: Oct. 30, 2018

(54) SYSTEM HAVING AT LEAST TWO OSCILLATION INSERT TOOLS

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 1542 days.

(21) Appl. No.: 13/818,780

(22) PCT Filed: Jul. 28, 2011

(86) PCT No.: PCT/EP2011/063041
§ 371 (c)(1),
(2), (4) Date: Jun. 10, 2013

(87) PCT Pub. No.: WO2012/025330
PCT Pub. Date: Mar. 1, 2012

(65) Prior Publication Data
US 2013/0269963 A1    Oct. 17, 2013

(30) Foreign Application Priority Data
Aug. 26, 2010   (DE) .......................... 10 2010 039 786

(51) Int. Cl.
B23D 61/00 (2006.01)
B23D 61/12 (2006.01)
(Continued)

(52) U.S. Cl.
CPC ............ B25F 5/006 (2013.01); B23D 61/006 (2013.01); B23D 61/123 (2013.01); B24B 23/04 (2013.01); B24B 41/007 (2013.01); B27B 19/006 (2013.01)

(58) Field of Classification Search
CPC .. B23D 61/006; B23D 61/123; B24B 41/007; B25F 5/006
(Continued)

(56) References Cited

U.S. PATENT DOCUMENTS 4,637,391 A * 1/1987 Schlein ................... A61F 15/02
30/133
5,306,285 A 4/1994 Miller et al.
(Continued)

FOREIGN PATENT DOCUMENTS

CN    101043987 A    9/2007
CN    101443166 A    5/2009
(Continued)

OTHER PUBLICATIONS

International Search Report corresponding to PCT Application No. PCT/EP2011/063041, dated Feb. 20, 2012 (German and English language document) (5 pages).

Primary Examiner — Thanh Truong
Assistant Examiner — Patrick Fry
(74) Attorney, Agent, or Firm — Maginot, Moore & Beck LLP

(57) ABSTRACT

The disclosure relates to a system having at least one first oscillation insert tool that is configured to be effectively coupled to an oscillation hand power tool, and at least one second oscillation insert tool that differs from the first oscillation insert tool and is configured to be effectively coupled to the oscillation hand power tool as an alternative to the first oscillation insert tool. At least one of the at least two oscillation insert tools comprises at least one compensating unit for at least substantially adapting a mass moment of inertia of the at least one oscillation insert tool to a mass moment of inertia of the at least one second oscillation tool.

7 Claims, 5 Drawing Sheets

(51) Int. Cl.
*B24B 23/04* (2006.01)
*B24B 41/00* (2006.01)
*B25F 5/00* (2006.01)
*B27B 19/00* (2006.01)

(58) Field of Classification Search
USPC ..................................................... 173/162.1
See application file for complete search history.

(56) References Cited

U.S. PATENT DOCUMENTS

| | | | | |
|---|---|---|---|---|
| 5,697,835 A | * | 12/1997 | Nitz | B23D 61/006 |
| | | | | 125/15 |
| 5,735,866 A | * | 4/1998 | Adams | A61B 17/14 |
| | | | | 30/339 |
| 6,684,481 B2 | * | 2/2004 | Kullmer | B23D 61/006 |
| | | | | 29/412 |
| 8,397,834 B2 | * | 3/2013 | Hellig | B24B 41/042 |
| | | | | 173/109 |
| 2003/0220058 A1 | * | 11/2003 | Pollak | B24B 23/04 |
| | | | | 451/357 |
| 2008/0027449 A1 | * | 1/2008 | Gundlapalli | A61B 17/14 |
| | | | | 606/82 |

FOREIGN PATENT DOCUMENTS

| | | | | |
|---|---|---|---|---|
| CN | 101663130 A | | 3/2010 | |
| DE | 10 2006 022 804 A1 | | 11/2007 | |
| DE | 102006022804 A1 | * | 11/2007 | ............. B24B 23/04 |
| DE | 10 2006 051 153 A1 | | 5/2008 | |
| DE | 102006051153 A1 | * | 5/2008 | ........... B27B 19/006 |
| EP | 1 882 538 A2 | | 1/2008 | |

\* cited by examiner

SYSTEM HAVING AT LEAST TWO OSCILLATION INSERT TOOLS

This application is a 35 U.S.C. § 371 National Stage Application of PCT/EP2011/063041, filed on Jul. 28, 2011, which claims the benefit of priority to Serial No. DE 10 2010 039 786.5, filed on Aug. 26, 2010 in Germany, the disclosures of which are incorporated herein by reference in their entirety.

BACKGROUND

There is already known an oscillating insert tool that can be operatively coupled to an oscillating hand power tool, and at least one second oscillating insert tool that differs from the first oscillating insert tool and that, as an alternative to the first oscillating insert tool, can be operatively coupled to the oscillating hand power tool.

SUMMARY

The disclosure proposes a system comprising at least one first oscillating insert tool that can be operatively coupled to an oscillating hand power tool, and comprising at least one second oscillating insert tool that differs from the first oscillating insert tool and that, as an alternative to the first oscillating insert tool, can be operatively coupled to the oscillating hand power tool, at least one of the at least two oscillating insert tools having at least one compensating unit, which is provided to adapt, at least substantially, a mass moment of inertia of the at least one oscillating insert tool to a mass moment of inertia of the at least second oscillating insert tool. In this context, a "compensating unit" is to be understood to mean, in particular, a unit that is provided deliberately, in particularly in respect of its function, at least substantially predominantly, preferably exclusively, to adapt a mass moment of inertia of the at least one oscillating insert tool to a mass moment of inertia of the at least second oscillating insert tool, and that differs, in particular, from working-related and function-related structural elements of the at least one oscillating insert tool that are necessary for proper functioning capability of the oscillating insert tool in combination with the oscillating hand power tool, such as, in particular, working means of a working region and/or receiving means such as, in particular, a centering recess and/or at least one driving recess, of a receiving region of the oscillating insert tool. A "working region" is to be understood to mean, in particular, a region of the basic body of the oscillating insert tool that preferably comprises at least one working means such as, for example, at least one saw tooth and/or an abrasive sanding means, that is provided to perform work on a workpiece. A "receiving region" is to be understood to mean, in particular, a region of the basic body of the oscillating insert tool that is provided to be operatively coupled to a tool receiver of the oscillating hand power tool. Preferably, the receiving region comprises receiving means such as, for example, the centering recess and the at least one driving recess, that can be directly coupled to the tool receiver of the oscillating hand power tool and/or that are in engagement with the tool receiver of the oscillating hand power tool. "Provided" is to be understood to mean, in particular, specially designed and/or specially equipped. In this context, "adapt, at least substantially" is to be understood to mean, in particular, that a difference between the mass moment of inertia of the first oscillating insert tool and the mass moment of inertia of the at least second oscillating insert tool about an oscillation axis that, when in operation, coincides with a rotational symmetry axis of an output shaft, in a provided operating state is, in particular, less than 20%, preferably less than 10%, and particularly less than 5% of the greatest mass moment of inertia of the at least two oscillating insert tools. In a particularly preferred design of the system according to the disclosure, the mass moments of inertia of the first and the at least second oscillating insert tool are of equal magnitude when the oscillating hand power tool is in an operating state.

As a result, it can preferably be achieved that the at least two mutually differing oscillating insert tools, when in an operating state, have mass moments of inertia of at least substantially equal magnitude. As a result, advantageously, a vibration compensating unit of the oscillating hand power tool, to which the at least two oscillating insert tools can be operatively coupled, can be precisely adapted to the mass moments of inertia of substantially equal magnitude of the at least two oscillating insert tools, thereby enabling vibrations of the oscillating hand power tool, when in an operating state, to be compensated, at least partially, preferably fully, irrespective of which of the at least two oscillating insert tools is operatively coupled to the oscillating hand power tool. In this context, "vibrations" are to be understood to mean, in particular, unwanted motions of the oscillating hand power tool that are caused, in particular, by mass moments of inertia produced by an oscillating motion of the oscillating insert tool that is operatively coupled to the oscillating hand power tool. In addition, noises caused by the vibrations can be reduced, in particular partially, and preferably fully, in an advantageously simple manner. As a result, advantageously, operating comfort for a user can be increased.

In addition, it is proposed that at least one third oscillating insert tool is provided, which has the compensating unit and which, as an alternative to the first and the at least second oscillating insert tool, can be operatively coupled to the oscillating hand power tool. If the system according to the disclosure has at least one third oscillating insert tool, whose mass moment of inertia is adapted, at least substantially, to the mass moments of inertia of the first and the at least second oscillating insert tool, when the oscillating hand power tool is in an operating state, flexibility of the system and of the oscillating hand power tool can be increased, advantageously, for the user.

Further, it is proposed that the compensating unit is disposed, at least partially, radially outside of a receiving region of a basic body of the at least one oscillating insert tool. In this context, "provided" is to be understood to mean, in particular, specially configured, designed and/or equipped. The disposition according to the disclosure of the compensating unit of the oscillating insert tool enables the compensating unit to be integrated into the basic body of the oscillating insert tool in an advantageously simple manner and, in particular, in a space-saving manner.

Furthermore, it is proposed that the compensating unit is constituted, at least partially, by at least one mass reduction disposed, at least partially, between a working region and a receiving region of a basic body. In this context, a "mass reduction" is to be understood to mean a region of the oscillating insert tool that, relative to a material thickness of the basic body of the oscillating insert tool, has an at least partial reduction of material thickness, preferably a full through-hole going through the material thickness of the basic body of the oscillating insert tool, perpendicularly in relation to a main extent of the oscillating insert tool, and/or that is of a lesser density than a material from which the basic body of the oscillating insert tool is made.

The design according to the disclosure enables the mass moment of inertia of the at least one oscillating insert tool to be adapted, in an advantageously simple manner, to at least one second, preferably also to at least one third, oscillating insert tool of the system according to the disclosure through a reduction of the mass moment of inertia. In addition, the compensating unit constituted by the at least one mass reduction can be integrated into the basic body of the oscillating insert tool, advantageously in a space-saving manner, such that the compensating unit does not constrain, at least substantially, an operating state of the oscillating hand power tool to which the oscillating insert tool according to the disclosure is operatively coupled. In a particularly preferred design of the compensating unit, the compensating unit is constituted, at least partially, in particular, by at least 2, preferably by at least 4, and particularly preferably by at least 6 mass reductions.

In a further design of the disclosure, it is proposed that the compensating unit is constituted, at least partially, by at least one additional mass. In this context, an "additional mass" is to be understood to mean, in particular, an additional element that is connected to the basic body of the oscillating insert tool, preferably by material bonding, such as, in particular, by welding, adhesive bonding and/or other methods considered appropriate by persons skilled in the art, the basic body and the element together constituting in this region a material thickness that, in total, is greater than a material thickness of the basic body of the oscillating insert tool in a region that is other than this region. In this context, an "additional mass" is preferably to be understood to mean also a material-thickness increase in the material thickness of the basic body of the oscillating insert tool, which increase is constituted by a protrusion that is formed, in particular integrally, on the basic body and that projects out of at least one plane of main extent in which the basic body extends in a region of the basic body that is other than the compensating unit. It is likewise conceivable for the additional mass to be constituted, alternatively or additionally, by an element that has a greater density than a material from which the basic body of the oscillating insert tool is made. Preferably, a contour of the additional mass differs, at least partially, preferably completely, from a contour of the basic body of the oscillating insert tool that extends in the plane of main extent of the oscillating insert tool and that is conditional purely upon function and/or stability and/or is geometrically appropriate.

As a result, the mass moment of inertia of the at least one oscillating insert tool can be easily adapted, advantageously, to at least one second, preferably also to at least one third, oscillating insert tool of the system according to the disclosure through an increase in the mass moment of inertia. In a particularly preferred design, the compensating unit is constituted, at least partially, in particular, by at least 2, preferably by at least 4, and particularly preferably by at least 6 additional masses.

It is proposed that a receiving region is disposed, at least partially, between a working region and the additional mass. The disposition according to the disclosure of the compensating unit constituted by the at least one additional mass enables the compensating unit to be disposed, advantageously in a space-saving manner, on the basic body of the oscillating insert tool, such that the compensating unit constituted by the at least one additional mass does not constrain, at least substantially, an operating state of the oscillating hand power tool to which the oscillating insert tool according to the disclosure is operatively coupled.

In a particularly preferred design of the disclosure, the compensating unit is constituted, at least partially, in particular, by at least 2, preferably by at least 4, and particularly preferably by at least 6 mass reductions and/or additional masses, the mass reductions and/or the additional masses being disposed in a preferably uniformly distributed manner over a basic body, preferably at least partially between the working region and the receiving region of the basic body. In this context, "uniformly distributed" is intended to mean, in particular, that the at least 2, preferably at least 4, and particularly preferably at least 6 mass reductions and/or the additional masses are disposed on the basic body, and/or are integrated into the basic body, in a preferably mirror-symmetrical manner in relation to at least one symmetry axis of the basic body of the oscillating insert tool. As a result, advantageously, imbalance caused by the compensating unit can be reduced, at least partially, preferably fully, in a simple manner.

Furthermore, the disclosure is based on an oscillating hand power tool comprising a tool receiver that is provided to receive an oscillating insert tool of a system.

It is proposed that the oscillating hand power tool has a vibration compensating unit provided to compensate, at least partially, preferably fully, a mass moment of inertia of an oscillating insert tool of a system.

Preferably, the vibration compensating unit comprises at least one compensating mass, which, for the purpose of compensating a vibration, in at least one operating state, is driven contrary to a direction of motion of the tool receiver. A "compensating mass" is to be understood to mean a component provided to compensate vibrations, at least partially, preferably fully, in an operating state. "Vibrations" are to be understood to mean, in particular, unwanted motions of the oscillating hand power tool that are caused, in particular, by mass moments of inertia produced by an oscillating motion of the oscillating insert tool that is operatively coupled to the oscillating hand power tool.

The vibration compensating unit according to the disclosure makes it possible, in particular, for vibrations to be reduced, preferably reduced to zero, when the oscillating hand power tool is in an operating state. As a result, advantageously, comfort in operation of the oscillating hand power tool can be increased for a user. In addition, noises resulting from unwanted vibrations when the oscillating hand power tool is in an operating state can be advantageously reduced, such that, particularly advantageously, the operating comfort can be increased for the user. In addition, the reduction of the vibrations, in particular the reduction of the vibrations to zero, makes it possible to achieve an advantageously precise working result when the oscillating hand power tool is in an operating state.

BRIEF DESCRIPTION OF THE DRAWINGS

Further advantages are given by the following description of the drawing. The drawing shows an exemplary embodiment of the disclosure. The drawing, the description and the claims contain numerous features in combination. Persons skilled in the art will also expediently consider the features individually and combine them to create appropriate further combinations.

In the drawing.

DETAILED DESCRIPTION

FIGS. 1 to 8 show a working unit comprising an oscillating hand power tool and comprising a system that has four oscillating insert tools 66, 68, 70, 72. The system can also comprise any combination of at least two of the four oscillating insert tools 66, 68, 70, 72.

Figure 1:
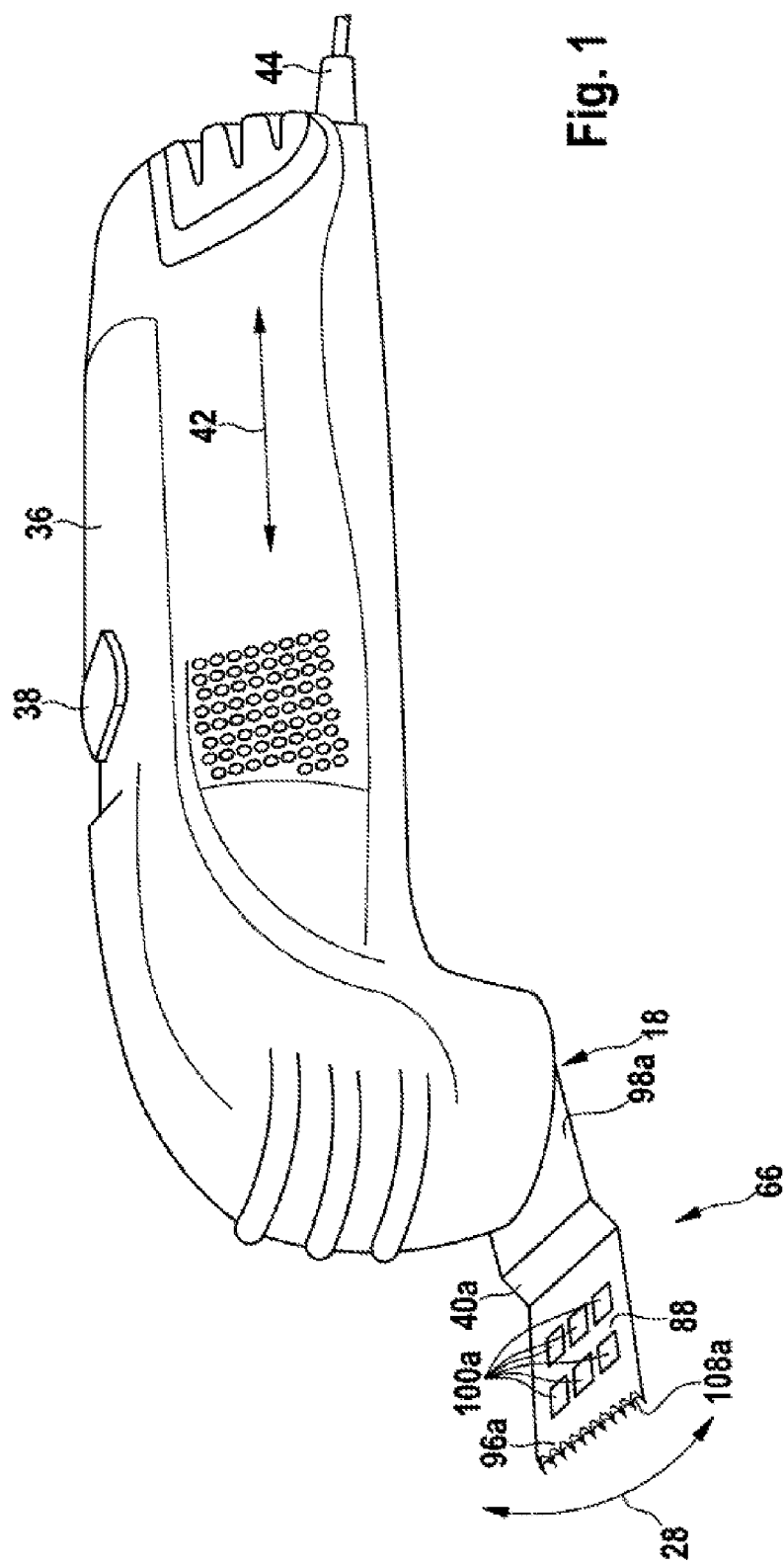
FIG. 1 shows a perspective side view of an oscillating hand power tool according to the disclosure, comprising an oscillating insert tool of a system according to the disclosure, which oscillating insert tool is operatively coupled to the oscillating hand power tool.

FIG. 1 shows the oscillating hand power tool, which has a switch 38, for switching the oscillating hand power tool on and off, integrated into a housing 36 of the oscillating hand power tool that serves as a handle. Disposed in a front region of the oscillating hand power tool is a tool receiver 18, with the oscillating insert tool 66 held therein. In addition, the oscillating hand power tool comprises a drive unit 10, constituted by an electric motor, not represented in greater detail, and a transmission unit 12. In a region that faces away from the tool receiver 18 in a direction of main extent 42 of the oscillating hand power tool, the oscillating hand power tool has an electric power cable 44 for supplying electric power to the drive unit 10.

Figure 2:
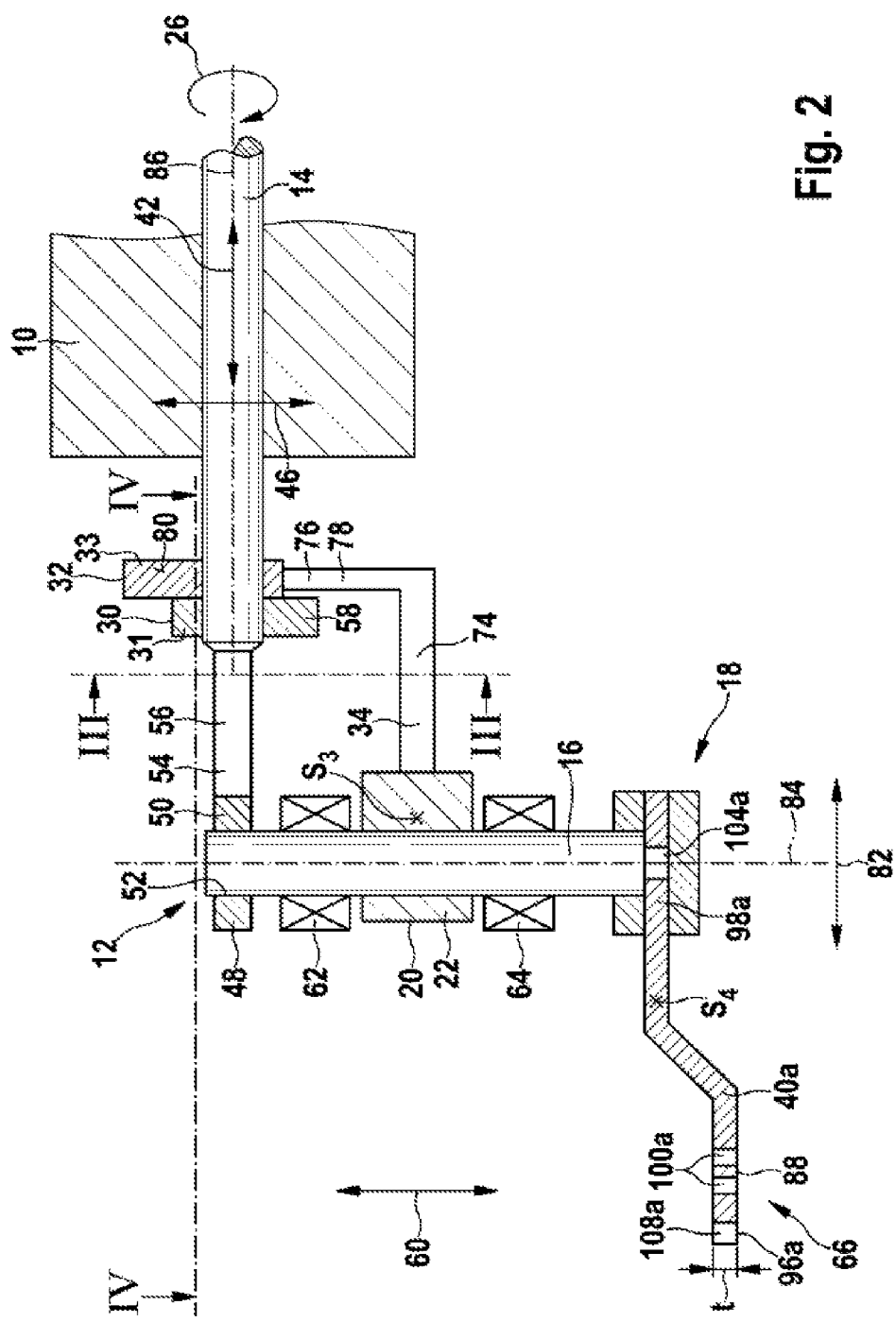
FIG. 2 shows a schematic sectional representation of a partial region of the oscillating hand power tool, comprising a transmission unit according to the disclosure and comprising a portion of a transmission unit.

The transmission unit 12 of the oscillating hand power tool is represented in greater detail in FIG. 2. The transmission unit 12 has an input shaft 14, which can be driven in rotation by means of the drive unit 10 and which is operatively connected to a first and a second cam mechanism 30, 32. The first cam mechanism 30 has a first eccentric element 31, which is pressed on to a free end of the input shaft 14. The second cam mechanism 32 has a second eccentric element 33, which is likewise pressed on to the input shaft 14. The eccentric elements 31, 33 are identical in their structural design and are disposed with an offset of 180°, such that a center of gravity $S_1$ of the first eccentric element 31, corresponding to a center point of the first eccentric element 31, and a center of gravity $S_2$ of the second eccentric element 33, corresponding to a center point of the second eccentric element 33, are disposed in series in a radial direction 46 of the input shaft 14. The first eccentric element 31 is operatively connected to an output shaft 16 of the transmission unit 12 via a first motion converter 48 configured in a level manner. "Configured in a level manner" is to be understood to mean, in particular, that the first motion converter 48 extends, at least substantially, in a plane disposed parallelwise in relation to the input shaft 14 of the drive unit 10 and perpendicularly in relation to the output shaft 16 of the transmission unit 12. "At least substantially" in this case is to be understood to mean, in particular, that the first motion converter 48, with the plane, encloses an angle that, in particular, is less than 15°, particularly preferably is less than 5°. In this exemplary embodiment, the first motion converter 48 is parallel to the plane.

The first motion converter 48 has a first region 50 that faces toward the oscillating insert tool 66 in the direction of main extent 42 of the oscillating hand power tool and that has a circular recess 52, into which the output shaft 16 is pressed. Furthermore, the first motion converter 48 has a second region 54, which extends, from an end of the first region 50 that faces away from the oscillating insert tool 66, in the direction of main extent 42, to the drive unit 10. The second region 54 of the first motion converter 48 has two arms 56. Ends of the arms 56 of the second region 54 of the first motion converter 48 that face toward the drive unit 10 engage, on opposing sides of the first eccentric element 31, on a circumferential surface 58.

The output shaft 16 of the transmission unit 12 extends, perpendicularly in relation to the direction of main extent 42 of the oscillating hand power tool, as viewed from the first motion converter 48, toward the tool receiver 18. The output shaft 16 is mounted by two bearings 62, 64 so as to be rotatable relative to the housing 36 of the oscillating hand power tool.

The tool receiver 18 is disposed on an end of the output shaft 16 that faces away from the first motion converter 48. The tool receiver 18 is represented merely schematically here.

A second motion converter 34, which has an angled configuration, engages on the second eccentric element 33. The second motion converter 34 is configured with a 90° angle, and comprises a first region 74 and a second region 76. The first region 74 of the second motion converter 34 is disposed parallelwise in relation to the input shaft 14 and is connected to a vibration compensating unit 20. The second region 76 of the second motion converter 34 adjoins an end of the first region 74 that faces away from the output shaft 16, and extends, parallelwise in relation to the output shaft 16, in an axial direction 60 of the output shaft, toward the input shaft 14. The second region 76 of the second motion converter 34 has two arms 78, the free ends of which, facing toward the input shaft 14, engage on opposing sides of a circumferential surface 80 of the second eccentric element 33.

The vibration compensating unit 20 is constituted by a compensating mass 22 that is realized so as to be integral with the second motion converter 34 and disposed so as to be rotatable about the output shaft 16. A center of gravity $S_3$ of the compensating mass 22 is disposed on a side of the output shaft 16 that faces toward the drive unit 10, in a radial direction 82 of the output shaft. A center of gravity $S_4$ of the insert tool 66 is disposed on the side of the output shaft 16 that is opposite the center of gravity $S_3$ of the compensating mass 22, in the radial direction 82 of the output shaft 16.

When the oscillating hand power tool is in an operating state, the input shaft 14, and the eccentric elements 31, 33 disposed on the input shaft 14, are driven in rotation by the drive unit 10. The eccentric motion of the first eccentric element 31 is taken up by the first motion converter 48 in a plane in which a rotational symmetry axis 86 of the input shaft 14 is located, and which is perpendicular to the output shaft 16. The eccentric motion of the second eccentric element 33 is taken up by the second motion converter 34 in a plane that extends parallelwise in relation to the direction of main extent 42 of the oscillating hand power tool and that is perpendicular to the output shaft 16. Produced as a result is an oscillating motion 28 of the first and the second motion converter 34, 48 about an axis that corresponds to a rotational symmetry axis 84 of the output shaft 16.

The oscillating motion 28 of the first motion converter 48 is transmitted, via the output shaft 16, to the tool receiver 18 and to the oscillating insert tool 66 held therein. The oscillating motion 28 of the second motion converter 34 is transmitted to the compensating mass 22, which is integrally connected to the second motion converter 34 and rotatably mounted on the output shaft 16 of the transmission unit 12.

Owing to the phase displacement of the oscillating motions 28 of the first and the second motion converter 34, 48, or of the tool receiver 18 and the compensating mass 22, vibrations that are caused by moments of inertia produced by an oscillating motion 28 of the insert tool 66 when the oscillating hand power tool is in an operating state are compensated by the compensating mass.

Figure 3:
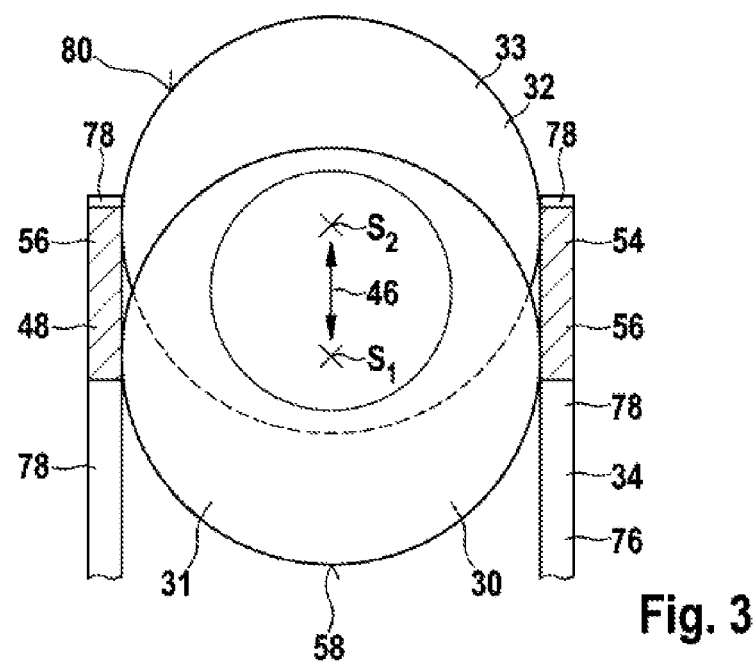
FIG. 3 shows a schematic sectional representation of the transmission unit of the oscillating hand power tool according to the disclosure, along the line III-III in FIG. 2.

FIG. 3 shows a sectional view along the line III-III. The centers of gravity $S_1$ and $S_2$ of the eccentric elements 31, 33, when in the position shown, lie on a straight line that is perpendicular to the direction of main extent 42 and parallel to the axial direction 60. The arms 56 of the first motion converter 48 bear against opposing sides of a circumferential surface 58 of the first eccentric element 31 in the radial direction 46 of the input shaft 14. The arms 78 of the second motion converter 34 bear against the circumferential surface 80 of the second eccentric element 33 in the radial direction 46 of the input shaft 14. The arms 78 of the second motion converter 34 extend perpendicularly in relation to the rotational symmetry axis 86 of the input shaft 14, behind the arms 56 of the first motion converter 48.

Figure 4:
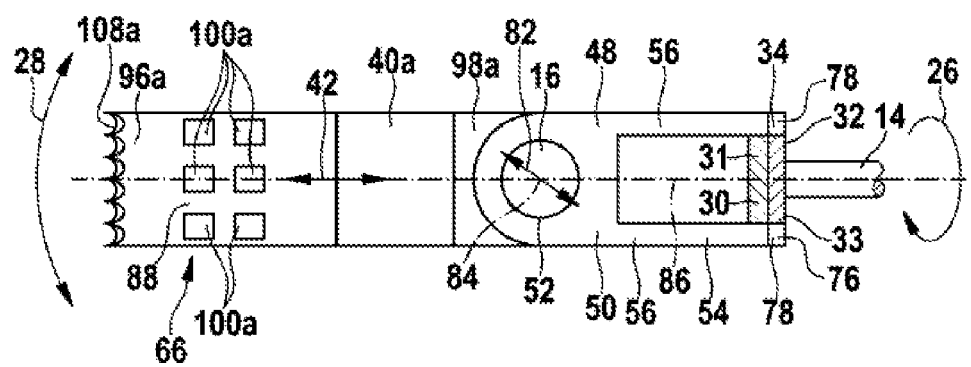
FIG. 4 shows a schematic sectional representation of the transmission unit of the oscillating hand power tool according to the disclosure, along the line IV-IV in FIG. 2.

FIG. 4 shows a portion of the oscillating hand power tool, in a section along the line IV-IV. The first motion converter 48 comprises the first region 50 having the recess 52, and comprises the second region 54 having the two arms 56. The ends of the arms 56 engage on the circumferential surface 58 of the first eccentric element 31, which is represented in section.

The ends of the arms 78 of the second motion converter engage on the circumferential surface 80 of the second eccentric element 33, which is likewise represented in section.

When the oscillating hand power tool is in an operating state, a rotary motion 26 of the drive unit 10 and of the input shaft 14 driven by the drive unit 10 is transmitted to the first and the second eccentric element 31, 33 that are pressed on to the input shaft 14. The first and the second eccentric element 31, 33 in this case describe an orbit, which is other than a circle, about a rotational symmetry axis 86 of the input shaft 14. The ends of the arms 56, 78 of the first and the second motion converter 34, 48 each respectively take up a component of the non-circular motion of the first and the second eccentric element 31, 33 in a direction that is perpendicular to the direction of main extent 42 of the oscillating hand power tool and perpendicular to the axial direction 60 of the output shaft 16. In this context, "non-circular" is to be understood to mean, in particular, being at least substantially different from a circle.

This component of the non-circular motion of the eccentric elements 31, 33 causes an opposing oscillating motion 28 of the first and the second motion converter 34, 48 about the rotational symmetry axis 84 of the output shaft 16.

The oscillating motion 28 of the first motion converter 48 is transmitted to the output shaft 16 pressed into the recess 52, and to the oscillating insert tool 66 that is fastened to the output shaft via the tool receiver 18. The oscillating motion 28 of the second motion converter 34 is transmitted to the compensating mass 22 of the vibration compensating unit 20 that is formed on to the second motion converter 34.

FIG. 5, FIG. 6, FIG. 7 and FIG. 8 show the system according to the disclosure with four oscillating insert tools (66, 68, 70, 72) that can be coupled, as alternatives to each other, to the oscillating hand power tool. Components and features that substantially correspond to each other are denoted, basically, by the same references, the letters a (FIG. 5), b (FIG. 6), c (FIG. 7) and d (FIG. 8) having been appended to the references in order to differentiate the four alternative designs. Also conceivable are other oscillating insert tools, considered appropriate by persons skilled in the art, that, as alternatives or in addition to the oscillating insert tools shown in FIGS. 5 to 8, can constitute part of the system according to the disclosure.

Figure 5:
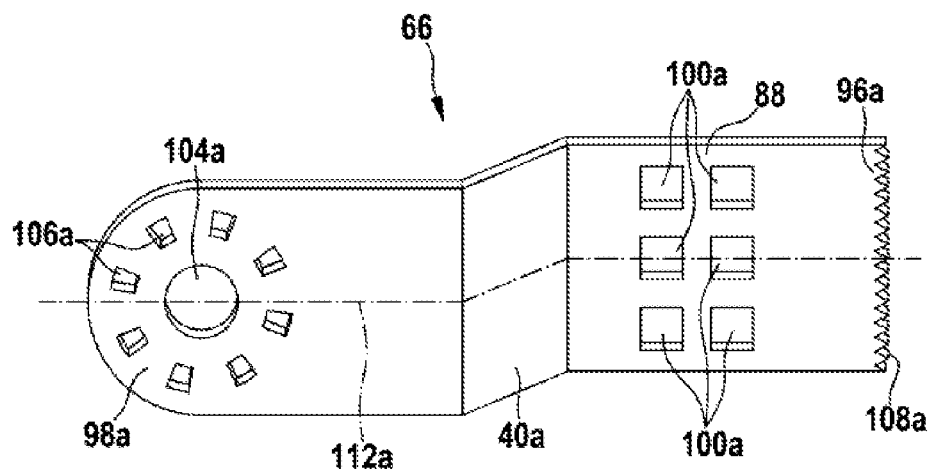
FIG. 5 shows a perspective and schematic top view of the oscillating insert tool of the system in a demounted state.

Shown in FIG. 5, in a demounted state, is the first oscillating insert tool 66 that, in FIGS. 1 to 4, is operatively coupled to the oscillating hand power tool. The oscillating insert tool 66 constitutes part of the system having four oscillating insert tools 66, 68, 70, 72. The oscillating insert tool 66 has a basic body 40a. The basic body 40a is made from a sheet metal.

The basic body 40a comprises a receiving region 98a and a working region 96a. The receiving region 98a has a centering recess 104a and a plurality of driving recesses 106a distributed uniformly around the centering recess 104a. When the oscillating insert tool 66 is in a mounted state, the centering recess 104a centers it in the tool holder 18, relative to the output shaft 16. When the oscillating insert tool 66 is in a mounted state, driving elements of the tool receiver 18, which are not represented in greater detail, engage in the driving recesses 106a. By means of the driving elements, which, when the oscillating insert tool 66 is in a mounted state, extend through the driving recesses 106a, the oscillating motion 28 of the output shaft 16 is transferred positively, via the tool receiver 18, to the oscillating insert tool 66. The working region 96a of the basic body 40a of the oscillating insert tool 66 has working means 108a constituted by saw teeth. The working means 108a of the working region 96a that are constituted by saw teeth constitute a straight saw-tooth geometry realized in the form of a line.

The basic body 40a of the first oscillating insert tool 66 constituted by an oscillating saw blade is realized so as to be axially symmetrical in relation to a symmetry axis 112a, which extends parallelwise in relation to the direction of main extent 42 of the oscillating hand power tool when the oscillating insert tool 66 is in a mounted state. The basic body 40a of the oscillating insert tool 66 extends in three planes. A first plane, in which the basic body 40a of the oscillating insert tool 66 extends, runs perpendicularly in relation to the rotational symmetry axis 84 of the output shaft 16 of the oscillating hand power tool, when the oscillating insert tool 66 is in a mounted state. In the first plane, the basic body 40a of the oscillating insert tool 66 has a rectangular plan, in a front region. The receiving region 98a is disposed in a region of the oscillating insert tool 66 that faces away from the rectangular plan, in the first plane. In this region, the basic body 40a of the oscillating insert tool 66 has a semicircular plan, which adjoins the rectangular plan in the front region. A second plane, in which a portion of the basic body 40*a* extends, runs parallelwise in relation to the first plane. The second plane is spaced apart from the plane in the axial direction 60 of the output shaft 16. When the oscillating insert tool 66 is in a mounted state, the second plane lies in the axial direction 60 of the output shaft 16, between the first plane and the oscillating hand power tool. The receiving region 98*a* of the basic body 40*a* of the oscillating insert tool 66 is disposed in the second plane. A further portion of the basic body 40*a* of the oscillating insert tool 66 connects the portion of the basic body 40*a* that extends in the first plane and the portion of the basic body 40*a* that extends in the second plane. The further portion of the basic body 40*a* extends in a third plane running obliquely in relation to the first and the second plane.

Between the receiving region 98*a* and the working region 96*a*, the basic body 40*a* has a compensating unit 88. The compensating unit 88 is disposed in the first plane of the basic body 40*a*. The compensating unit 88 is disposed radially outside of the receiving region 98*a* of the basic body 40*a* of the first oscillating insert tool 66. The compensating unit 88 comprises 6 mass reductions 100*a*. The 6 mass reductions 100*a* are disposed in two rows that, when the oscillating insert tool 66 is in a mounted state, are perpendicular to the direction of main extent 42 of the oscillating hand power tool. The mass reductions 100*a* are constituted by through-holes through a material thickness t of the basic body 40*a* of the oscillating insert tool 66. The mass reductions 100*a* of the compensating unit 88 of the first oscillating insert tool 66 that are constituted by through-holes are disposed so as to be axially symmetrical in relation to the symmetry axis 112*a* of the basic body 40*a* of the first oscillating insert tool 66. The mass reductions 100*a* of the compensating unit 88 of the first oscillating insert tool 66 are disposed between the working region 96*a* and the receiving region 98*a* of the basic body 40*a* of the first oscillating insert tool 66.

Figure 6:
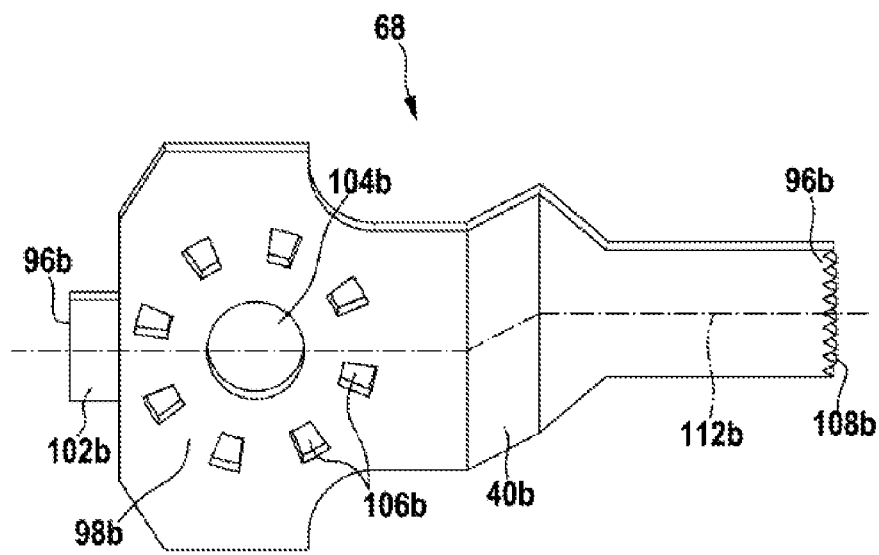
FIG. 6 shows a perspective and schematic top view of an oscillating insert tool of the system, in a demounted state, that can be operatively coupled, as an alternative to the oscillating insert tool from FIG. 5, to the oscillating hand power tool.

Shown in FIG. 6, in a demounted state, is a second oscillating insert tool 68, which can be operatively coupled, as an alternative to the first oscillating insert tool 66, to the oscillating hand power tool. The second oscillating insert tool 68 constitutes part of the system having four oscillating insert tools 66, 68, 70, 72. The second oscillating insert tool is constituted by an oscillating saw blade. The second oscillating insert tool 68 has a basic body 40*b*. The basic body 40*b* is made from a sheet metal. The basic body 40*b* of the second oscillating insert tool 68, constituted by an oscillating saw blade, is disposed so as to be axially symmetrical in relation to a symmetry axis 112*b* that, when the oscillating insert tool 68 is in a mounted state, extends parallelwise in relation to the direction of main extent 42 of the oscillating hand power tool. The basic body 40*b* comprises a receiving region 98*b* and a working region 96*b*. The receiving region 98*b* has a centering recess 104*b* and a plurality of driving recesses 106*b*, which are distributed uniformly around the circumference of the centering recess 104*b*. The centering recess 104*b* is provided to center the second oscillating insert tool 68 in the tool receiver 18, relative to the output shaft 16, when said tool is in a mounted state. When the second oscillating insert tool 68 is in a mounted state, driving elements of the tool receiver 18, which are not represented in greater detail, engage in the driving recesses 106*b*. By means of the driving elements that extend through the driving recesses 106*b* when the second oscillating insert tool 68 is in a mounted state, an oscillating motion 28 of the output shaft 16 is transmitted positively, via the tool receiver 18, to the second oscillating insert tool 68.

The working region 96*b* of the basic body 40*b* of the second oscillating insert tool 68 has working means 108*b* constituted by saw teeth. The working means 108*b* of the working region 96*b* of the second oscillating insert tool 68 that are constituted by saw teeth constitute a straight, linear sawtooth geometry. The working region 96*b* of the second oscillating insert tool 68 is realized so as to be narrower, as viewed perpendicularly in relation to the symmetry axis 112*b* of the second oscillating insert tool 68, than the working region 96*a* of the first oscillating insert tool 66, likewise as viewed perpendicularly in relation to the symmetry axis 112*a* of the first oscillating insert tool 66.

The basic body 40*b* of the second oscillating insert tool 68 extends in three planes. A first plane, in which a first portion of the basic body 40*b* of the oscillating insert tool 68 extends, runs perpendicularly in relation to the rotational symmetry axis 84 of the output shaft 16 of the oscillating hand power tool, when the oscillating insert tool 68 is in a mounted state. In the first plane, the basic body 40*b* of the second oscillating insert tool 68 has a rectangular plan, in a front region. The receiving region 98*b* is disposed in a region of the second oscillating insert tool 68 that faces away from the rectangular plan, in the first plane. In this region, the basic body 40*b* of the second oscillating insert tool 68 likewise has a rectangular plan, which has flattened corners on a side of the rectangular plan that faces away from the a working region 96*b* of the basic body 40*b* of the second oscillating insert tool 68. The rectangular plans of the two regions of the first part of the basic body 40*b* are connected to each other via a curved, concave contour. A second plane, in which a portion of the basic body 40*b* extends, runs parallelwise in relation to the first plane. The second plane is spaced apart from the first plane in the axial direction 60 of the output shaft 16. When the second oscillating insert tool 68 is in a mounted state, the first plane lies in the axial direction 60 of the output shaft 16, between the second plane and the oscillating hand power tool. The receiving region 98*b* of the basic body 40*b* of the second oscillating insert tool 68 is disposed in the second plane. A further portion of the basic body 40*b* of the oscillating insert tool 68 connects the portion of the basic body 40*b* that extends in the first plane and the portion of the basic body 40*b* that extends in the second plane. The further portion of the basic body 40*b* extends in a third plane running obliquely in relation to the first and the second plane.

Formed on to the basic body 40*b*, on a side of the receiving region 98*b* that faces away from the working region 96*b* of the second oscillating insert tool 68, there is a compensating unit 90. The compensating unit 90 is disposed radially outside of the receiving region 98*b* of the basic body 40*b* of the second oscillating insert tool 68. The compensating unit 90 comprises an additional mass 102*b*. The additional mass 102*b* is fastened in a materially bonded manner to an edge of the basic body 40*b* of the second oscillating insert tool 68, and connected to the basic body 40*b*. The additional mass 102*b* is realized so as to be integral with the basic body 40*b* of the oscillating insert tool 68. The additional mass 102*b* of the compensating unit 90 of the second oscillating insert tool 68 extends in a direction running parallelwise in relation to the symmetry axis 112*b* of the second oscillating insert tool 68, from an edge of the basic body 40*b* of the second oscillating insert tool 68 that, as viewed in the direction running parallelwise in relation to the symmetry axis 112*b*, is disposed so as to face away from the working region 96*b*, parallelwise in relation to the symmetry axis 112*b*, away from the basic body 40*b* of the second oscillating insert tool 68. The receiving region 98*b* of the basic body 40*b* is disposed between the working region 96*b* of the basic body 40*b* and the additional mass of the compensating unit 90.

When the second oscillating insert tool 68 is in a mounted state on the oscillating hand power tool, the oscillating hand power tool being in an operating state, the design, dimensioning and positioning of the additional mass 102*b* of the compensating unit 98*b* are such that the second oscillating insert tool 68 has the same mass moment of inertia as the first oscillating insert tool 66 of the system.

Figure 7:
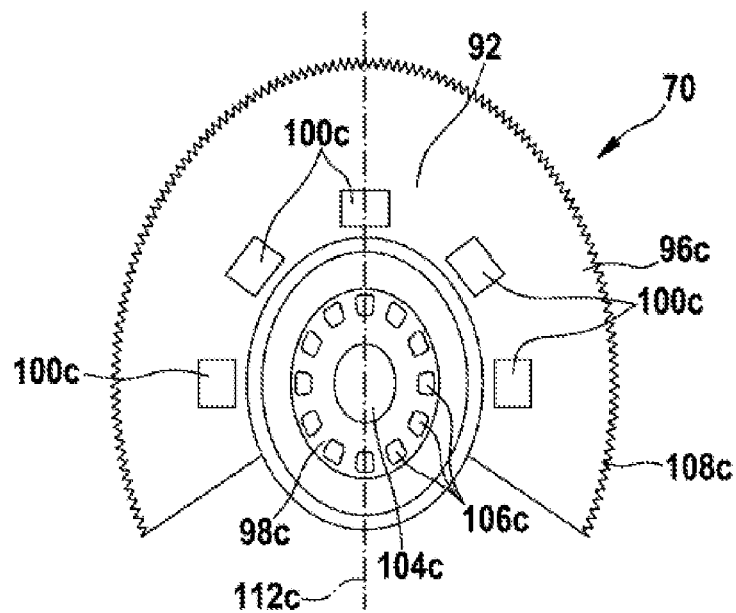
FIG. 7 shows a schematic top view of an oscillating insert tool of the system, in a demounted state, that can be operatively coupled, as an alternative to the oscillating insert tools from FIGS. 5 and 6, to the oscillating hand power tool.

Shown in FIG. 7, in a demounted state, is the third oscillating insert tool 70, which is realized as a saw blade and which can be operatively coupled, as an alternative to the first or the second oscillating insert tool 66, 68, to the oscillating hand power tool.

The third oscillating insert tool 70 constitutes part of the system having the four oscillating insert tools 66, 68, 70, 72. The third oscillating insert tool 70 has a basic body 40*c*. The basic body 40*c* is made from a sheet metal. The basic body 40*c* comprises a receiving region 98*c* and a working region 96*c*. The receiving region 98*c* has a centering recess 104*c* and a plurality of driving recesses 106*c*, which are distributed uniformly around a circumference of the centering recess 104*c*. The centering recess 104*c* is provided to center the third oscillating insert tool 70 in the tool receiver 18, relative to the output shaft 16, when said tool is in a mounted state. When the third oscillating insert tool 70 is in a mounted state, driving elements of the tool receiver 18, which are not represented in greater detail, engage in the driving recesses 106*c*. By means of the driving elements that extend through the driving recesses 106*c* when the third oscillating insert tool 70 is in a mounted state, the oscillating motion 28 of the output shaft 16 is transmitted positively, via the tool receiver 18, to the third oscillating insert tool 70.

The working region 96*c* of the basic body 40*c* of the third oscillating insert tool 70*c* has working means 108*c* constituted by saw teeth. The working region 96*c* extends over a portion of an outer region of the basic body 40*c*. The working means 108*c* of the working region 96*c* that are constituted by saw teeth constitute a curved, arcuate sawtooth geometry. The basic body 40*c* has a first region in the form of a segment of a circle. The first region of the basic body 40*c*, in the form of a segment of a circle, comprises the working region 96*c* and the compensating unit 92. In addition, the basic body 40*c* has a second, circular region, which comprises the receiving region 98*c*. The receiving region 98*c* is disposed radially inside the second, circular region of the basic body 40*c*, and extends in a plane disposed so as to be parallel to and spaced apart from a plane of the first region of the basic body 40*c*, which is in the form of a segment of a circle. The basic body 40*c* of the third oscillating insert tool 70 is axially symmetrical in relation to a symmetry axis 112*c* that, when the third oscillating insert tool 70 is in a mounted state, extends parallelwise in relation to the direction of main extent 42 of the oscillating hand power tool. The compensating unit 92 is disposed radially outside of the receiving region 98*c* of the basic body 40*c* of the third first oscillating insert tool 70. The compensating unit 92 of the third oscillating insert tool 70 comprises five mass reductions 100*c*. The five mass reductions 100*c* are disposed in a distributed manner over the first region of the basic body 40*c*, which is in the form of a segment of a circle. The mass reductions 100*c* of the compensating unit 92 are disposed in an axially symmetrical manner in relation to the symmetry axis 112*c* of the basic body 40*c* of the third oscillating insert tool 70. The mass reductions 100*c* are constituted by through-holes through a material thickness t of the basic body 40*c* of the oscillating insert tool 70. The mass reductions 100*c* of the compensating unit 92 of the third oscillating insert tool 70 are disposed between the working region 96*c* and the receiving region 98*c* of the basic body 40*c* of the first oscillating insert tool 70.

Figure 8:
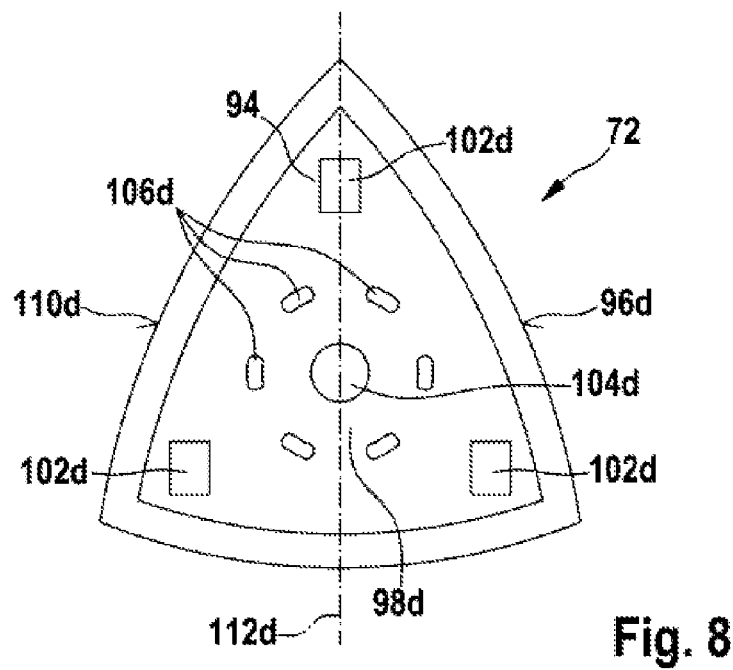
FIG. 8 shows a schematic top view of an oscillating insert tool of the system, in a demounted state, that can be operatively coupled, as an alternative to the oscillating insert tools from FIGS. 5, 6 and 7, to the oscillating hand power tool.

Shown in FIG. 8, in a demounted state, is a fourth oscillating insert tool 72, which can be operatively coupled, as an alternative to the first, the second or the third oscillating insert tool 66, 68, 70 to the oscillating hand power tool. The fourth oscillating insert tool 72 constitutes part of the system of at least two oscillating insert tools 66, 68, 70, 72. The fourth oscillating insert tool 72 is constituted by a sanding plate. The fourth oscillating insert tool 72 has a basic body 40*d*. The basic body 40*d* comprises a receiving region 98*d* and a working region 96*d*.

A shape of the basic body 40*d* of the oscillating insert tool 72 corresponds to a projection of a spherical triangle on to a plane. The basic body 40*d* of the fourth oscillating insert tool 72 is realized so as to be axially symmetrical in relation to a total of three symmetry axes 112*d*. The symmetry axes 112*d* go through a center point of the centering recess 104*d* and, respectively, through a corner of the basic body 40*d*. The basic body 40*d* comprises a carrier plate, which comprises the receiving region 98*d* and a compensating unit 94. The receiving region 98*d* is disposed on a first side, which extends in a plane of main extent of the fourth oscillating insert tool 72. The receiving region 98*d* is disposed centrally on the basic body 40*d*.

The receiving region 98*d* has a centering recess 104*d* and a plurality of driving recesses 106*d*, which are distributed uniformly around a circumference of the centering recess 104*d*. The centering recess 104*d* is provided to center the fourth oscillating insert tool in the tool receiver 18, relative to the output shaft 16, when said tool is in a mounted state. When the fourth oscillating insert tool 72 is in a mounted state, driving elements of the tool receiver 18, which are not represented in greater detail, engage in the driving recesses 106*d*. By means of the driving elements that extend through the driving recesses 106*d* when the fourth oscillating insert tool 72 is in a mounted state, an oscillating motion 28 of the output shaft 16 is transmitted positively, via the tool receiver 18, to the fourth oscillating insert tool 72.

The working region 96*d* of the basic body 40*d* of the fourth oscillating insert tool 72 has working means 108*d* constituted by abrasive sanding means. The working means 108*d* constituted by abrasive sanding means constitute a sanding liner. The working region 96*d* of the fourth oscillating insert tool 72 is disposed on an underside 110*d* of the basic body 40*d* that faces away from the first side, which extends in a plane of main extent of the fourth oscillating insert tool 72.

The compensating unit 94 is disposed radially outside of the receiving region 98*d* of the basic body 40*d* of the fourth oscillating insert tool 72. The compensating unit 94 of the fourth oscillating insert tool 72 comprises three additional masses 102*d*. The three additional masses 102*d* are disposed radially outside of the receiving region 98*d*, on the basic body 40*d* of the fourth oscillating insert tool 72. The additional masses 102*d* of the compensating unit 94 of the fourth oscillating insert tool 72 are disposed between the working region 96*d* and the receiving region 98*d* of the basic body 40*d* of the first oscillating insert tool 72. The three additional masses 102*d* of the compensating unit 94 are disposed in a uniformly distributed manner over the basic body 40*d* of the fourth oscillating insert tool 72. One additional mass 102*d* of the compensating unit 94 is in each case disposed, respectively, in a corner of the basic body 40d. The additional masses 102d of the compensating unit 94 of the fourth oscillating insert tool 72 are disposed in an axially symmetrical manner in relation to the symmetry axes 112d of the basic body 40d of the fourth oscillating insert tool 72.

The compensating units 88, 90, 92, 94 of the four oscillating insert tools 66, 68, 70, 72 of the system are provided to adapt the mass moments of inertia of the four oscillating insert tools 66, 68, 70, 72 of the system, about the rotational symmetry axis 84 of the output shaft 16 of the oscillating hand power tool, to each other. The vibration compensating unit 20 of the oscillating hand power tool is adapted to the mass moment of inertia of the four oscillating insert tools 66, 68, 70, 72 of the system, such that vibrations, produced by mass moments of inertia when the oscillating hand power tool is in an operating state, can be compensated.

The invention claimed is:

1. A system comprising:
   a first oscillating insert tool that is configured to be operatively coupled to an oscillating hand power tool; and
   a second oscillating insert tool that differs from the first oscillating insert tool and that, as an alternative to the first oscillating insert tool, is configured to be operatively coupled to the oscillating hand power tool,
   wherein at least one of the first and second oscillating insert tools includes at least one compensating unit configured to adapt a first mass moment of inertia of the first oscillating insert tool about an oscillation axis in an operating state of the oscillating hand power tool and a second mass moment of inertia of the second oscillating insert tool about the oscillation axis in the operating state to one another in such a way that a difference between the first mass moment of inertia and the second mass moment of inertia is less than 20% of a greater of the first mass moment of inertia and the second mass moment of inertia.

2. The system as claimed in claim 1, further comprising:
   a third oscillating insert tool, which, as an alternative to the first oscillating insert tool and the second oscillating insert tool, is configured to be operatively coupled to the oscillating hand power tool,
   wherein the at least one compensating unit is further associated with the third oscillating insert tool so as to adapt a third mass moment of inertia of the third oscillating insert tool.

3. The system as claimed in claim 1, wherein the at least one compensating unit is disposed, at least partially, radially outside of a receiving region of a basic body of the at least one of the first and second oscillating insert tools.

4. The system as claimed in claim 1, wherein the at least one compensating unit is constituted, at least partially, by at least one mass reduction disposed, at least partially, between a working region and a receiving region of a basic body of the at least one of the first and second oscillating insert tools.

5. The system as claimed in claim 1, wherein the at least one compensating unit is constituted, at least partially, by at least one additional mass.

6. The system as claimed in claim 5, wherein a receiving region is disposed, at least partially, between a working region of the at least one of the first and second oscillating insert tools and the at least one additional mass.

7. A working unit comprising:
   an oscillating hand power tool including a tool receiver, a vibration compensating unit, and having an oscillation axis in an operating state of the oscillating hand power tool; and
   a system including (i) a first oscillating insert tool that is configured to be operatively coupled to the tool receiver, and (ii) a second oscillating insert tool that differs from the first oscillating insert tool and that, as an alternative to the first oscillating insert tool, is configured to be operatively coupled to the tool receiver,
   wherein at least one of the first and second oscillating insert tools includes at least one compensating unit configured to adapt a first mass moment of inertia of the first oscillating insert tool about the oscillation axis and a second mass moment of inertia of the second oscillating insert tool about the oscillation axis to one another in such a way that a difference between the first mass moment of inertia and the second mass moment of inertia is less than 20% of a greater of the first mass moment of inertia and the second mass moment of inertia, and
   wherein the vibration compensating unit is configured to compensate, at least partially, the first mass moment of inertia when the first oscillating insert tool to a is operatively coupled to the tool receiver and the second mass moment of inertia when the second oscillating insert tool is operatively coupled to the tool receiver.

* * * * *

UNITED STATES PATENT AND TRADEMARK OFFICE
CERTIFICATE OF CORRECTION

PATENT NO. : 10,112,294 B2
APPLICATION NO. : 13/818780
DATED : October 30, 2018
INVENTOR(S) : Robert Fuchs Page 1 of 1

It is certified that error appears in the above-identified patent and that said Letters Patent is hereby corrected as shown below:

In the Claims

In Column 14, Lines 40-42, Lines 24-26 of Claim 7 should read:
wherein the vibration compensating unit is configured to
    compensate, at least partially, the first mass moment of
    inertia when the first oscillating insert tool is Signed and Sealed this
Second Day of April, 2019

Andrei Iancu
*Director of the United States Patent and Trademark Office*